April 28, 1931.  R. A. FONTAINE  1,803,058
TRUCK
Filed July 21, 1926  2 Sheets-Sheet 1
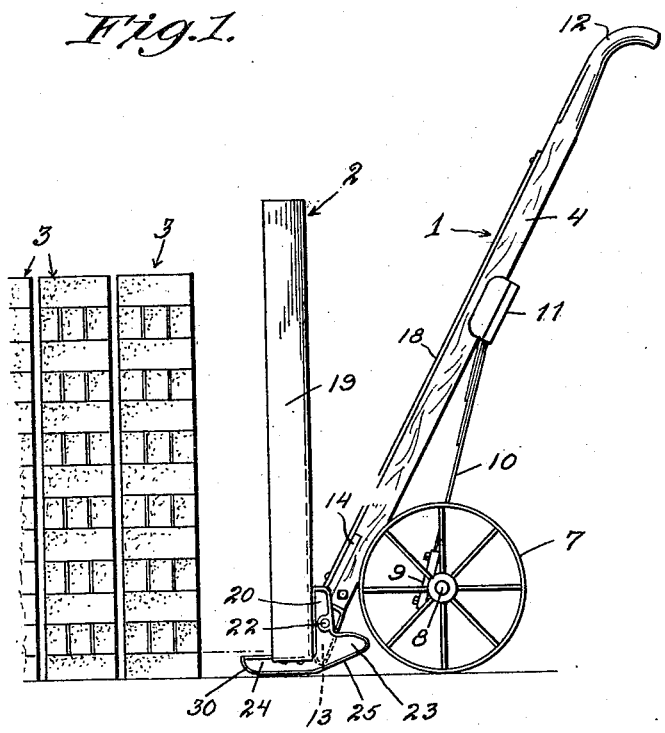
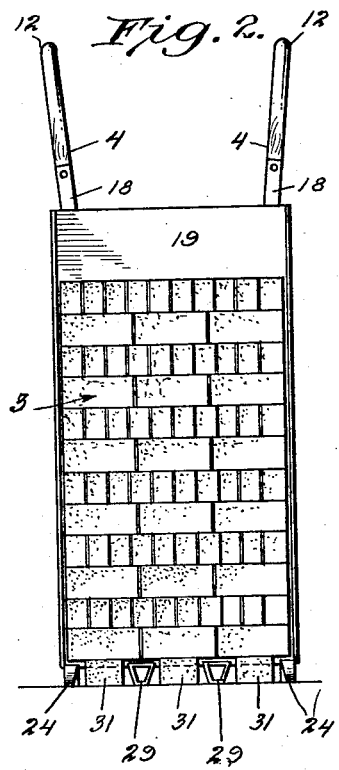
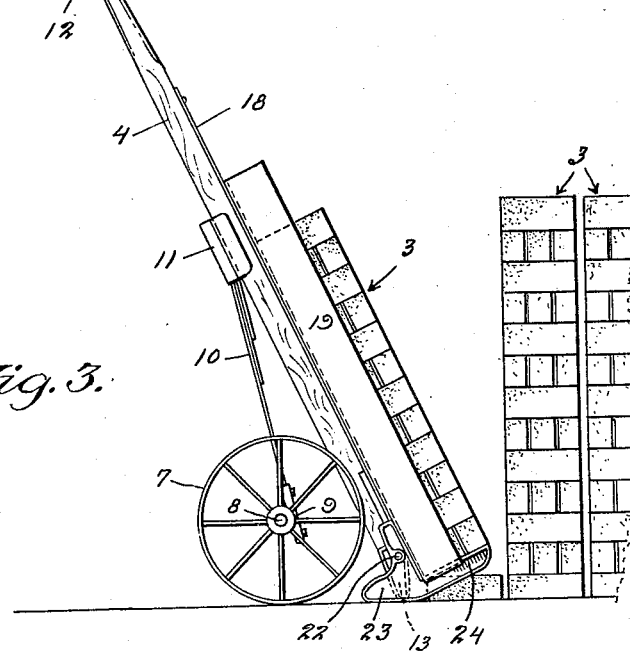

April 28, 1931. R. A. FONTAINE 1,803,058
TRUCK
Filed July 21, 1926 2 Sheets-Sheet 2
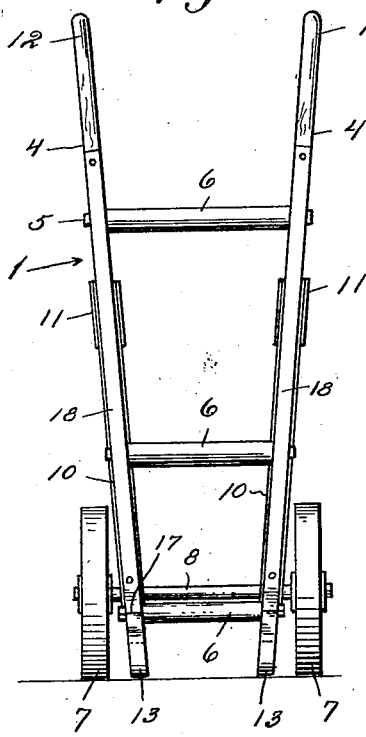
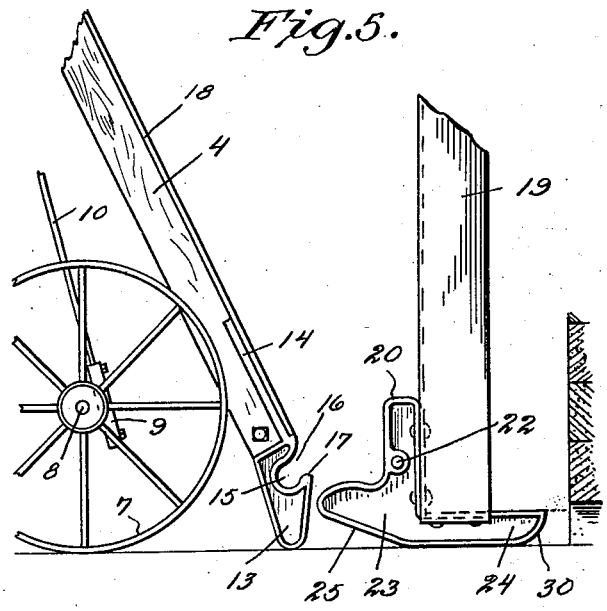
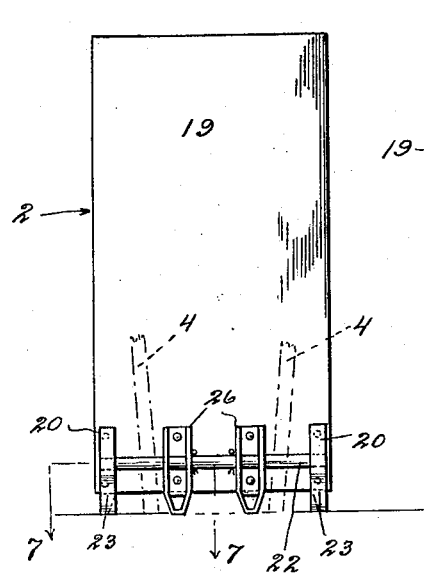
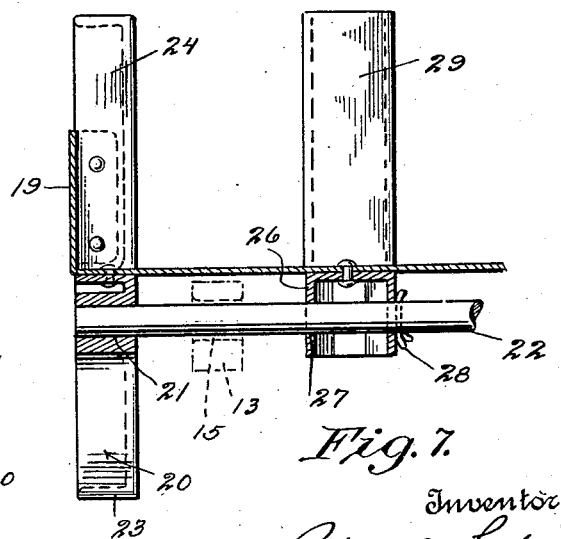

Patented Apr. 28, 1931

1,803,058

UNITED STATES PATENT OFFICE

ROBERT A. FONTAINE, OF MARTINSVILLE, VIRGINIA

TRUCK

Application filed July 21, 1926. Serial No. 123,930.

The invention relates to trucks, particularly those intended for use in handling stacks or hacks of bricks or the like.

The principal object of the invention, generally stated, is to provide a wheeled truck having a detachable body member adapted to be engaged with a hack or stack of bricks whereby the bricks may be transported from place to place while maintained in stack or hack form, no upsetting of the arrangement occurring during movement.

Another object of the invention is to provide a brick handling device embodying a wheeled truck and any desired number of similar body members adapted to be detachably engaged therewith or thereby and of course engageable with stacks or hacks of bricks or the like, it being consequently possible to handle a large number of stacks by means of a single truck, the truck and body arrangement being such that the body may be left in operative relation to the stack subsequent to movement thereof or disengageable from the stack while remaining attached to the truck.

An important object of the invention is to provide a brick handling device of this character which does not require the employment of a pallet to form a support for the bricks, it being merely necessary to employ a few loose bricks at the bottom of the stack arranged in spaced relation to permit the insertion of supporting elements carried by the body.

A more specific object of the invention is to provide a truck in combination with a detachable body therefor, the latter having means whereby accidental forward tilting thereof beyond a vertical position will be prevented, and having means whereby limited rearward tilting is permitted to facilitate engagement with or by the truck during the operation of lifting a hack or stack from its resting place and for subsequently depositing it at a new location.

An additional object of the invention is the provision of a device of this character which will be simple and inexpensive to manufacture, easy and convenient to use, efficient and durable in service, a great time and labor saver, and a general improvement in the art.

With the above and other objects and advantages in view, the invention preferably consists in the combination and arrangement of elements and the structural features to be hereinafter more fully described and claimed, and illustrated in the accompanying drawings in which:

Figure 1 is a side elevation of a truck and body therefor constructed in accordance with my invention, the body being shown connected with the truck and in position to be engaged with a hack or stack of bricks or the like to be moved, Figure 2 is an elevation taken at right angles to Figure 1, looking at a stack of bricks and showing the manner in which the supporting elements carried by the body engage beneath the stack, Figure 3 is a side elevation showing the body tilted and lying against the truck and engaged with a stack or hack of bricks, the position shown being either that preparatory to transportation or to depositing, Figure 4 is a front elevation of the truck with the body detached therefrom, Figure 5 is a fragmentary side elevation showing the lower end of the truck frame and the body, the latter being detached from the former, Figure 6 is a rear elevation of the body detached from the truck, and Figure 7 is a detail cross sectional view taken on the line 7—7 of Figure 6 and looking in the direction of the arrows.

Referring more particularly to the drawings, the numeral 1 designates, generally, the wheeled truck, 2 designates the removable or detachable body therefor as a whole, and 3 hacks or stacks of bricks to be handled or transported from place to place.

The truck 1 includes a frame which may conveniently comprise a pair of preferably diverging bars 4 held in proper spaced relation by securing members 5 and spacing sleeves 6 or their equivalent. This truck also includes ground engaging wheels 7 mounted on an axle 8 extending through suitable bearing elements 9 which are preferably carried by leaf springs 10 secured in some convenient manner to the bars 4, as for instance by clips or anchor members 11. The bars 4 have their upper ends formed or provided with handles 12 which are preferably curved and rounded off for the comfort of the operator. The purpose in providing the spring mounting is to permit hacks or stacks of bricks to be carried about with the minimum shock or jar thereto.

The lower ends of the bars 4 are shown as provided with metallic members 13, preferably formed as castings and bolted or otherwise suitably secured in place, these metallic members being shown as having extensions 14 thereon let into the bars 4 to be flush therewith. The forward edges of the members 13 are formed with sockets or recesses 15, the openings 16 to which are higher than the sockets, when the truck is considered in substantially upright position, so as to define retaining lips or projections 17. The purpose of the sockets will be hereinafter made apparent. If the bars 4 be constructed of wood, as may probably be the case, it is preferable that the forward edges thereof be protected by metallic wear strips 18 suitably secured in place. Obviously, if the bars 4 be constructed of metal the wear strips may be omitted. However, these are details which have very slight importance.

The detachable body 2 used in conjunction with the truck 1 is preferably formed as a trough or pan-like rectangular member 19 open at both ends which may conveniently be formed of sheet metal cut and bent to shape, though there is no limitation in this respect. This pan member is of such size as to be capable of containing a hack or stack of bricks 3 as will be readily apparent. Riveted or otherwise suitably secured to the member 19 at the lower corners thereof are metallic shoe members 20, preferably formed as castings, these members having openings 21 within which is mounted a rod or shaft 22 which extends transversely of the member 19 in spaced relation to the back or bottom thereof. These shoe members 20 are of angular formation and include heel portions 23 and toe portions 24, the latter projecting forwardly beneath the open lower end of the member 19 and beyond the front or open side thereof. The lower or underneath surfaces 25 of the heel members 23 are inclined with respect to the longitudinal axis of the member 19 so that the body will be capable of being tilted rearwardly into an inclined position as shown in Figure 3.

Suitably secured to the member 19 are preferably channeled foot members 26 having openings 27 for the passage of the shaft or rod 22, and a convenient method of preventing longitudinal displacement of this shaft or rod is to provide cotter pins or the like 28 passing through the shaft or rod and engaging against the members 26. These members 26 are preferably formed with forwardly extending toe pieces 29 which correspond to the toe pieces 24 of the shoe members 20 and which preferably extend the same distance in advance of the open front of the member 19. The lower or outer corners of the toe pieces 24 and 29 are preferably rounded off as indicated at 30 to facilitate engagement of the toe pieces between supporting bricks or the like 31 on which the hack or stack is supported, these bricks 31 being spaced apart, as clearly indicated in Figure 2, so that the toe pieces may be inserted between them and beneath the lowermost rows or bricks in the hack or stack. The shaft or rod 22 is located at such position as to be capable of engagement within the sockets 15 in the end members 13 of the truck. Owing to the fact that the openings 16 to the recesses 15 are arranged as shown and described it is apparent that after the rod or shaft 22 is engaged within the sockets accidental disengagement will be prevented by the lips or projections 17.

In the use of the device, it will be seen that the body 2 may be connected with the truck 1 by engaging the rod or shaft 22 within the sockets 15 and these two elements may then be considered as one. If this be done in the first place, the truck may be wheeled to a point near the hack or stack 3 of bricks to be moved, as illustrated in Figure 1, and the body member 2 may then be swung into the vertical position disclosed, subsequent to which further movement of the truck 1 toward the hack or stack will bring the toe pieces 24 and 29 between the supporting bricks 31 and beneath the hack resting thereon, as illustrated in Figure 2. Owing to the shape of the shoes 20 it is clear that the member 2 will not tip forwardly while it is being moved into engagement with the stack. The operator then grasps the upper end of the member 2 and pulls it rearwardly against the truck, the bricks being tilted into an inclined position as shown in Figure 3. The engagement of the inclined surfaces 25 of the shoes 20 with the ground or floor will limit this tilting movement and will act temporarily as a support. The operator may then grasp the handles 12 and allow the truck to assume a substantially horizontal position. The load of bricks or the like may then be moved about freely and without danger of dislocation of any of the individual ones.

Instead of initially engaging the body with the truck, it is obvious that the body may, in detached condition, be engaged with a hack of bricks, subsequently to which the truck may be wheeled up and manipulated to engage the sockets 15 with the rod or shaft 22. This separated position of the parts is particularly well illustrated in Figure 5.

Assuming that a hack of bricks has been carried to where it is desired to deposit the same, the operator tilts the truck into an upwardly inclined position, and permits the body 2 to assume a vertical position. It is of course necessary that a suitable number, in the present instance three, of bricks 31 be placed where it is desired to deposit the stack and the body 2 is so maneuvered as to bring the toe pieces 24 and 29 between these bricks. At such a time it is of course not intended that the shoes 20 bear upon the surface traveled over but when the body containing the hack of bricks is in the proper position, the operator swings the truck to a more nearly vertical position, thus permitting the stack to engage upon the bricks 31. The truck may then be pulled away, carrying the body with it or it may be disengaged from the body and pulled away, leaving the body in engagement with the stack.

By means of a device constructed in this manner, it will be apparent that stacks or hacks of bricks may be handled easily and expeditiously and, moreover, without any necessity for the employment of a supporting pallet or its equivalent. The stacks may be kept in perfect shape, there being no likelihood or even possibility of collapsing or other displacement. It is really believed that the construction, operation and advantages will be readily apparent to one skilled in the art without further explanation.

While I have shown and described a preferred embodiment of the invention, it should be understood that the disclosure is merely an exemplification of the principles involved and that I reserve the right to make such changes in the details of construction and the arrangement and combination of parts as will widen the field of utility and increase the adaptability of the device, provided such changes constitute no departure from the spirit of the invention or the scope of the claims hereunto appended.

Having thus described the invention, I claim:

1. In a brick handling device, a truck including a frame, supporting means carried thereby, an axle carried by the supporting means and equipped with ground engaging wheels, in combination with a body of casing-like formation adapted to be embracingly engaged upon a hack of bricks resting upon spaced supporting elements, foot members carried by the body and having toe pieces adapted to enter between said supporting elements for engagement beneath the hack, and means detachably and pivotally connecting the body with the truck frame, said foot members having ground engaging surfaces at an angle to the toe pieces.

2. In a brick handling device, a truck including a frame, supporting means carried thereby, an axle carried by the supporting means and equipped with ground engaging wheels, a body of casing-like formation adapted to be embracingly engaged upon a hack of bricks resting upon spaced supporting elements, foot members carried by the body and having toe pieces adapted to enter between said supporting elements for engagement beneath the hack, and means detachably and pivotally connecting the body with the truck frame, the truck frame being swingable in a vertical plane about said axle as a pivot for varying the position of the body with respect to the ground or floor while maintaining the same relation to the truck the foot members each having a plurality of ground engaging surfaces.

3. A brick handling device, comprising the combination of a wheeled truck including a frame provided with end members having sockets therein, a body of trough-like form adapted to lie upon the truck, shoe members at the lower end of the body having toe portions projecting beyond the front of the body, the shoe members having inclined heel portions projecting beyond the back thereof to permit limited tilting and means carried by said shoe members and engageable within said sockets.

4. A brick handling device, comprising the combination of a wheeled truck including a frame provided with end members having sockets therein, a body of trough-like form adapted to lie upon the truck, shoe members at the lower end of the body having toe portions projecting beyond the front thereof and having inclined heel portions projecting beyond the back thereof, and means carried by said shoe members and engageable within said sockets, said sockets opening out at the front of the truck at points defining projections constituting retaining means for said means.

5. A brick handling device comprising a wheeled truck including frame members having sockets near their lower ends, a body adapted to lie upon the truck, shoe members at the lower end of the body having projecting portions extending beyond the front of the body, and trunnions on said shoe members engageable within said sockets.

6. A brick handling device comprising a wheeled truck including frame members having sockets in their front faces near their lower ends, a body adapted to lie upon the truck, shoe members at the lower end of the body having portions projecting beyond the front thereof, and lateral projections on the shoe members engageable within said sockets, the shoe members having upwardly inclined heel portions permitting tilting of the body while it is pivotally connected with the truck by the engagement of said lateral projections within said sockets.

In testimony whereof I affix my signature.

ROBERT A. FONTAINE.